United States Patent
Zhang (10) Patent No.: US 11,334,401 B2
(45) Date of Patent: May 17, 2022

(54) APPLICATION PAGE INTERCEPTION METHOD AND DEVICE

(71) Applicant: BEIJING XIAOMI MOBILE SOFTWARE CO., LTD., Beijing (CN)

(72) Inventor: Xiang Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 16/740,406

(22) Filed: Jan. 11, 2020

(65) Prior Publication Data

US 2021/0089371 A1 Mar. 25, 2021

(30) Foreign Application Priority Data

Sep. 20, 2019 (CN) .......................... 201910894375.X (51) Int. Cl.
*G06F 9/54* (2006.01)
*G06F 9/48* (2006.01)

(52) U.S. Cl.
CPC ............ *G06F 9/542* (2013.01); *G06F 9/4812* (2013.01)

(58) Field of Classification Search
None
See application file for complete search history.

(56) References Cited

U.S. PATENT DOCUMENTS

| 6,625,583 | B1 * | 9/2003 | Silverman | G06F 3/0483 |
| | | | | 705/35 |
| 2005/0135264 | A1 * | 6/2005 | Popoff | H04L 67/22 |
| | | | | 370/252 |
| 2015/0371040 | A1 * | 12/2015 | Ding | G06F 21/554 |
| | | | | 726/23 |

FOREIGN PATENT DOCUMENTS

| CN | 108111675 A | 6/2018 |
| CN | 108810275 A | 11/2018 |
| WO | 2014012500 A1 | 1/2014 |

OTHER PUBLICATIONS

Extended European Search Report in Application No. 20157678, dated Aug. 25, 2020.

* cited by examiner

*Primary Examiner* — Craig C Dorais
(74) *Attorney, Agent, or Firm* — Syncoda LLC; Feng Ma (57) ABSTRACT

An application page interception method includes running a target application and responding to an operation for the target application; receiving application information of other applications, which includes operation display pages; determining whether the application information matches the predetermined interception strategy; and prohibiting the operation display pages of the other applications from popping up when the application information matches the predetermined interception strategy. The method can prohibit the operation display pages of other applications from popping up according to the predetermined interception strategy when the target application is run, so as to avoid the user from being disturbed by the popped-up operation display pages of other applications when the target application is run, thereby improving the user experience.

17 Claims, 9 Drawing Sheets

APPLICATION PAGE INTERCEPTION METHOD AND DEVICE

CROSS-REFERENCE TO RELATED APPLICATION

This application claims priority to Chinese Patent Application 201910894375.X filed on Sep. 20, 2019, the disclosure of which is hereby incorporated by reference in its entirety.

BACKGROUND

With the popularity of smart terminals, their configurations are getting more sophisticated, and their functions are becoming more powerful. Users' daily lives rely more on various smart terminals, and they can work or play on the terminals at anytime and anywhere.

SUMMARY

The present disclosure generally relates to the field of terminal technologies, and more specifically to an application page interception method and device.

In an aspect, there is provided in embodiments of the present disclosure an application page interception method applied to a user terminal, the method comprises: running a target application, and responding to an operation for the target application; receiving application information of other applications, which includes operation display pages of the other applications; determining whether the application information matches a predetermined interception strategy; and prohibiting operation display pages of the other applications from popping up when the application information matches the predetermined interception strategy.

In some embodiments, the predetermined interception strategy is based on cloud configuration.

In some embodiments, the method further comprises: determining whether a running mode of the target application is in a do-not-disturb mode; and determining whether the application information matches the predetermined interception strategy when the running mode of the target application is in the do-not-disturb mode.

In some embodiments, the method further comprising: when the application information matches the predetermined interception strategy, generating a prompt message according to the application information, and displaying the prompt message through the floating window.

In some embodiments, the method further comprising: popping up operation display pages of the other applications when a user views the prompt message.

In another aspect, there is provided in embodiments of the present disclosure an application page interception device applied to a user terminal, the device comprises: a running module configured to run a target application, and responding to an operation for the target application; a receiving module configured to receive application information of other applications, which includes operation display pages of the other applications; a determining module configured to determine whether the application information matches the predetermined interception strategy; and a prohibiting module configured to prohibit operation display pages of the other applications from popping up when the application information matches the predetermined interception strategy.

In some embodiments, the predetermined interception strategy is based on cloud configuration.

In some embodiments, the determining module is further configured to: determine whether a running mode of the target application is in a do-not-disturb mode; and determine whether the application information matches the predetermined interception strategy when the running mode of the target application is in the do-not-disturb mode.

In some embodiments, the device further comprises a prompt module; when the determining module determines that the application information matches the predetermined interception strategy, the prompt module is configured to generate a prompt message according to the application information, and display the prompt message through the floating window.

In some embodiments, the device further comprises a popping-up module configured to: pop up operation display pages of the other applications when a user views the prompt message.

In yet another aspect, there is provided in embodiments of the disclosure an electronic device, comprising: a memory configured to store instructions; and a processor configured to invoke the instructions to execute the application page interception method.

In yet another aspect, there is provided in embodiments of the disclosure a non-transitory computer-readable storage medium having stored thereon instructions that, when executed by a processor perform the application page interception method.

It is to be understood that the above general description and the detailed description below are merely exemplary and explanatory, and do not limit the present disclosure.

BRIEF DESCRIPTION OF THE DRAWINGS

The accompanying drawings, which are incorporated in and constitute a part of this description, illustrate embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

While operating the terminal on some occasions, a user may not want to be interrupted by other applications when running the target application. The application software installed on some terminal, such as instant messaging software, which may pop up a call request page at any time, may affect continuous operations of the user and cause inconvenience to the user.

The application page interception method provided in embodiments of the present disclosure can be applied to terminals such as a smart phone, a smart tablet, a wearable device, a personal handheld assistant, etc. The specific type of the electronic device is not limited in the present disclosure. For the convenience of description, the present disclosure is described below by taking a method applied to a smart terminal as an example.

Figure 1:
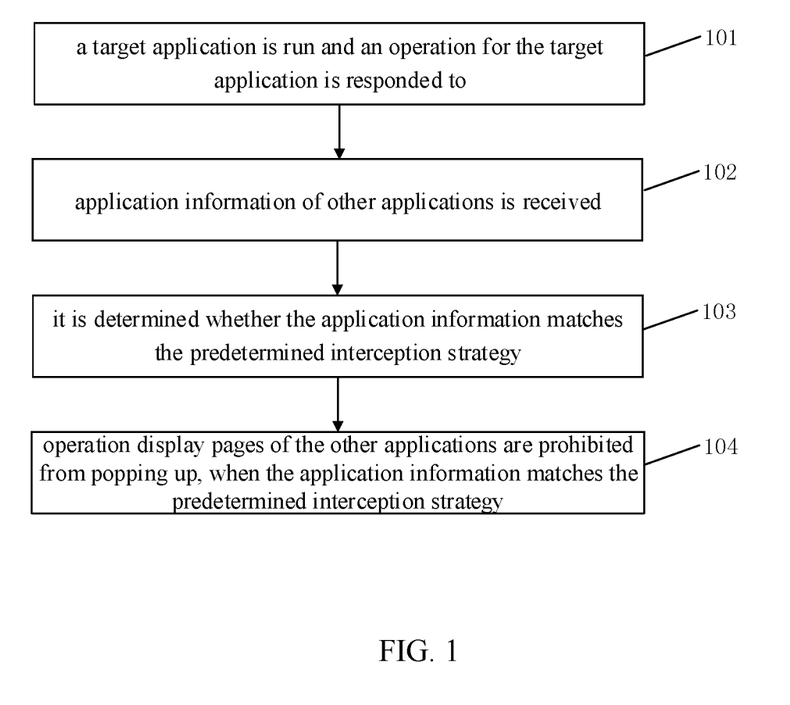
FIG. 1 is a flowchart of an application page interception method according to an exemplary embodiment of the present disclosure.

FIG. 1 is a flowchart of an application page interception method according to an exemplary embodiment of the present disclosure. As shown in FIG. 1, the method includes:

In step S101, a target application is run and an operation for the target application is responded to.

The smart terminal is installed with a large number of applications, and the target application can be an application that is currently run by a user. The operation for the target application may be an on-going operation for the application. For example, the smart terminal can be a terminal having a touch screen; the user performs a touch operation on a touch area of the touch screen, and the smart terminal may detect a touch gesture of the user, generate a touch signal according to the touch gesture, and respond to the touch signal.

In step S102, application information of other applications is received.

In a process of running the target application, application information of other applications is received, the other applications can be applications other than the target application, and cloud application information of other applications includes operation display pages of other applications, for example, popping up information about the operation display pages of other applications.

In step S103, it is determined whether the application information matches the predetermined interception strategy.

The acquired application information of the other applications is compared with a predetermined interception strategy, and the predetermined interception strategy may be selected by the user or set by the user.

The predetermined interception strategy may include name information, icon information, authority information, version information, or other information of the application. For example, a predetermined interception strategy includes the name information of the operation display page, and comparing the acquired application information of the other application with the predetermined interception strategy can be determining whether the name information of the page which is included in the application information matches the page name information in the predetermined interception strategy.

It can be understood that the other application information of the application can also be compared with the predetermined interception strategy. The type of the predetermined interception strategy and the type of the application information are not limited in the present disclosure.

In step S104, operation display pages of the other applications are prohibited from popping up, when the application information matches the predetermined interception strategy.

When the application information of other applications matches the predetermined interception strategy, indicating that other applications are applications that need to be intercepted, the operation display pages of the other applications are prohibited from popping up.

The application page interception method provided in the present disclosure receives application information of other applications when a target application is run, and determines whether the application information matches a predetermined interception strategy. When the application information matches the predetermined interception strategy, operation display pages of the other applications are prohibited from popping up. The method can prohibit the operation display page of other applications from popping up according to the predetermined interception strategy when a target application is run, so as to avoid the user from being disturbed by the popped-up operation display page of other applications when the target application is run, thereby improving the user experience.

In an embodiment, the predetermined interception strategy is based on a cloud configuration. The predetermined interception strategy can be configured in the cloud. According to the interception strategy delivered by the cloud control, it is determined whether the application information of the application other than the target application matches the predetermined interception strategy, so that the real-time update of the predetermined interception strategy can be implemented, thereby making it more effective to prohibit the pop-up of the operation display pages of the other applications.

Figure 2:
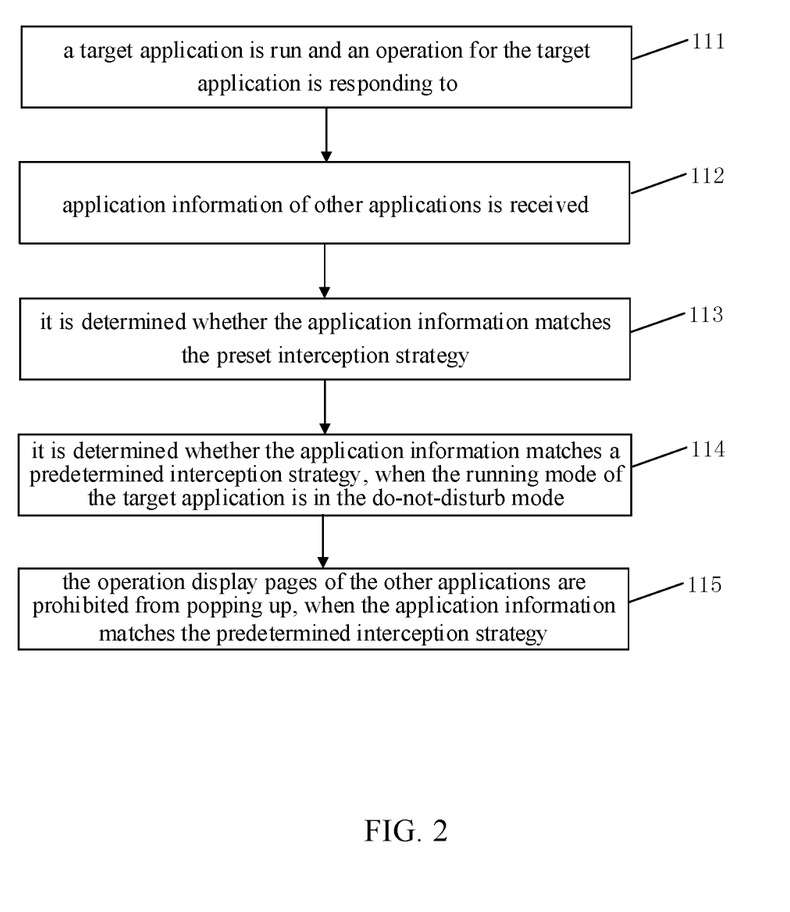
FIG. 2 is a flowchart of an application page interception method according to another exemplary embodiment of the present disclosure.

FIG. 2 is a flowchart of an application page interception method according to another exemplary embodiment of the present disclosure. As shown in FIG. 2, the method includes:

In step S111, a target application is run and an operation for the target application is responded to.

In step S112, application information of other applications is received.

In step S113, it is determined whether a running mode of the target application is in a do-not-disturb mode.

In step S114, it is determined whether the application information matches a predetermined interception strategy, when the running mode of the target application is in the do-not-disturb mode.

The target application is in a running state, that is, the target application is displayed on the screen of the smart terminal and the operation for the target application is responded to. The target application can be a predetermined application, which can be one or more applications, or can be one or more types of applications. For example, the target application is a game type application.

The target application can be set to be a do-not-disturb mode during running, and the do-not-disturb mode is a predetermined running mode that prevents the external interference. For example, when the user uses the target application, to prevent the terminal from being interrupted by other applications, the target application can be set to be the do-not-disturb mode. It can be understood that, the user can set the do-not-disturb mode according to own preferences, and the user can also select the do-not-disturb mode predetermined by the smart terminal.

For example, the user can set the do-not-disturb mode of the target application as system fully muted, and any received message or phone call will be muted. For another example, the user can set the do-not-disturb mode of the target application to prohibit popping up other application pages, so as to prevent the running of the target application from being interrupted.

In step S115, the operation display pages of the other applications are prohibited from popping up, when the application information matches the predetermined interception strategy.

When the running mode of the target application is in the do-not-disturb mode, it is determined whether the application information matches the predetermined interception strategy. It can be understood that when the target application mode is in a normal state, it means that the user does not care whether the other applications may affect the target application when using the target application, the determination on whether to intercept the application page may not be performed. The application page interception is determined according to the user's settings, thereby avoiding unnecessary application page interception, saving resources, and making it more flexible and effective to prohibit the pop-up of the operation display pages of the other applications.

Figure 3:
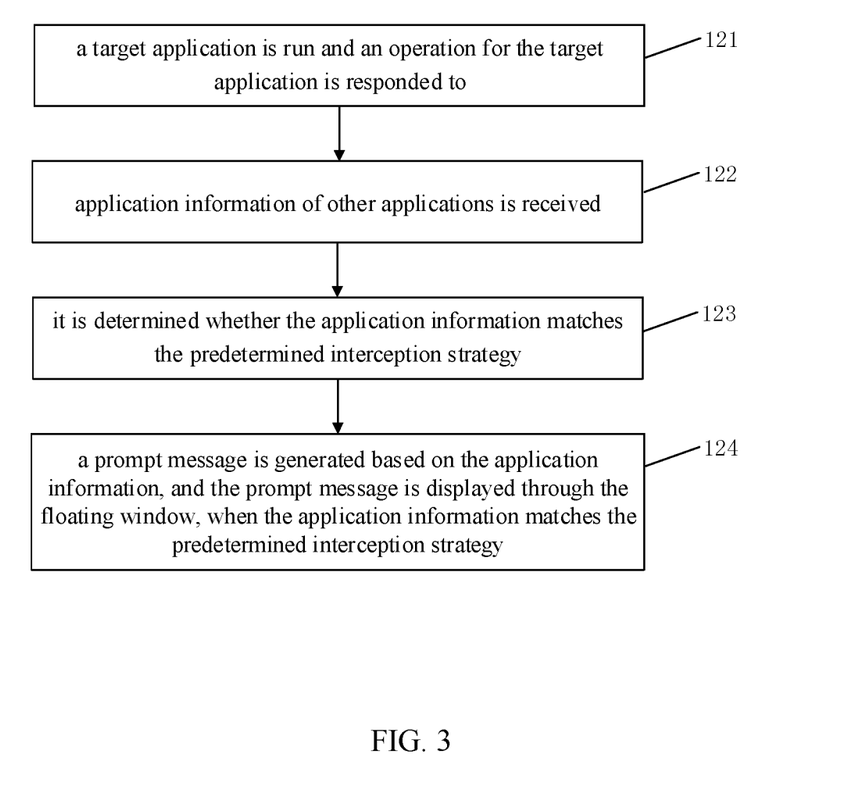
FIG. 3 is a flowchart of an application page interception method according to yet another exemplary embodiment of the present disclosure.

FIG. 3 is a flowchart of an application page interception method according to yet another exemplary embodiment of the present disclosure. As shown in FIG. 3, the method includes:

In step S121, a target application is run and an operation for the target application is responded to.

In step S122, application information of other applications is received.

In step S123, it is determined whether the application information matches the predetermined interception strategy.

In step S124, a prompt message is generated based on the application information, and the prompt message is displayed through the floating window, when the application information matches the predetermined interception strategy.

When the application information of other applications matches the predetermined interception strategy, the operation display page of the other applications is prohibited from popping up. A prompt message is generated based on the application information, and the prompt message is displayed through the floating window, to prompt the user that other applications are requesting to run and ask the user to confirm whether to run the application, so as to make the application page interception more suitable for user needs and more practical.

It can be understood that the prompt message is generated based on the application information. The prompt can also be performed in other ways, such as a sound prompt, a vibrating prompt, a pop-up prompt, or a prompt in a prompt area.

Figure 4:
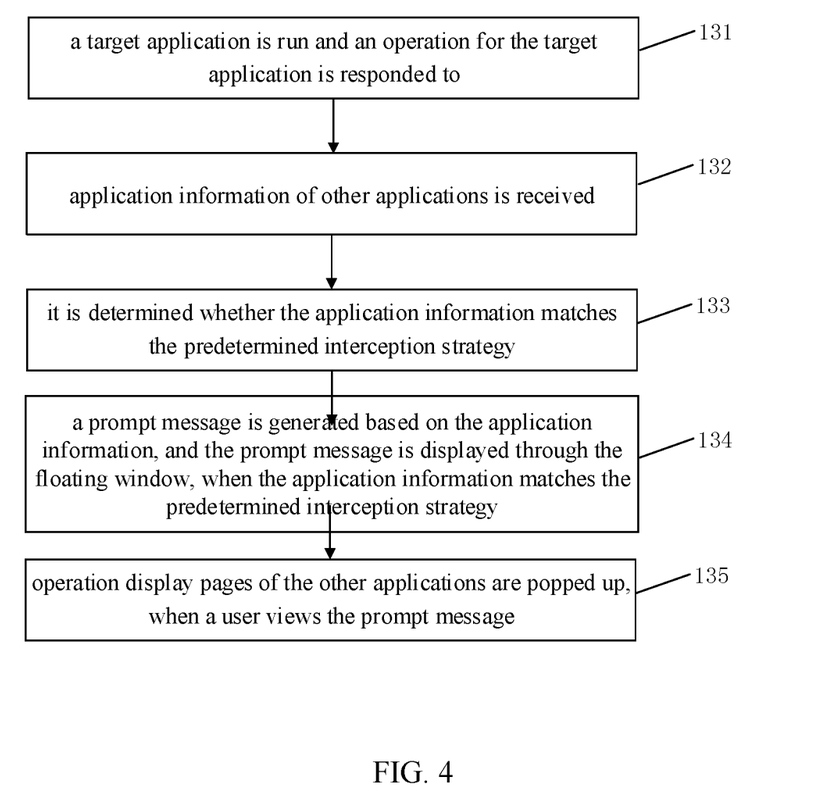
FIG. 4 is a flowchart of an application page interception method according to yet another exemplary embodiment of the present disclosure.

FIG. 4 is a flowchart of an application page interception method according to yet another exemplary embodiment of the present disclosure. As shown in FIG. 4, the method includes:

In step S131, a target application is run and an operation for the target application is responded to.

In step S132, application information of other applications is received.

In step S133, it is determined whether the application information matches the predetermined interception strategy.

In step S134, a prompt message is generated based on the application information, and the prompt message is displayed through the floating window, when the application information matches the predetermined interception strategy.

In step S135, operation display pages of the other applications are popped up, when a user views the prompt message.

The user can determine whether to prohibit the pop-up of the operation display pages of the other applications according to the importance of the target application and other applications prompted in the prompt information. When the user views the prompt message, the operation display pages of the other applications are popped up, so as to avoid affecting the use of the other applications that are relatively important.

Figure 5:
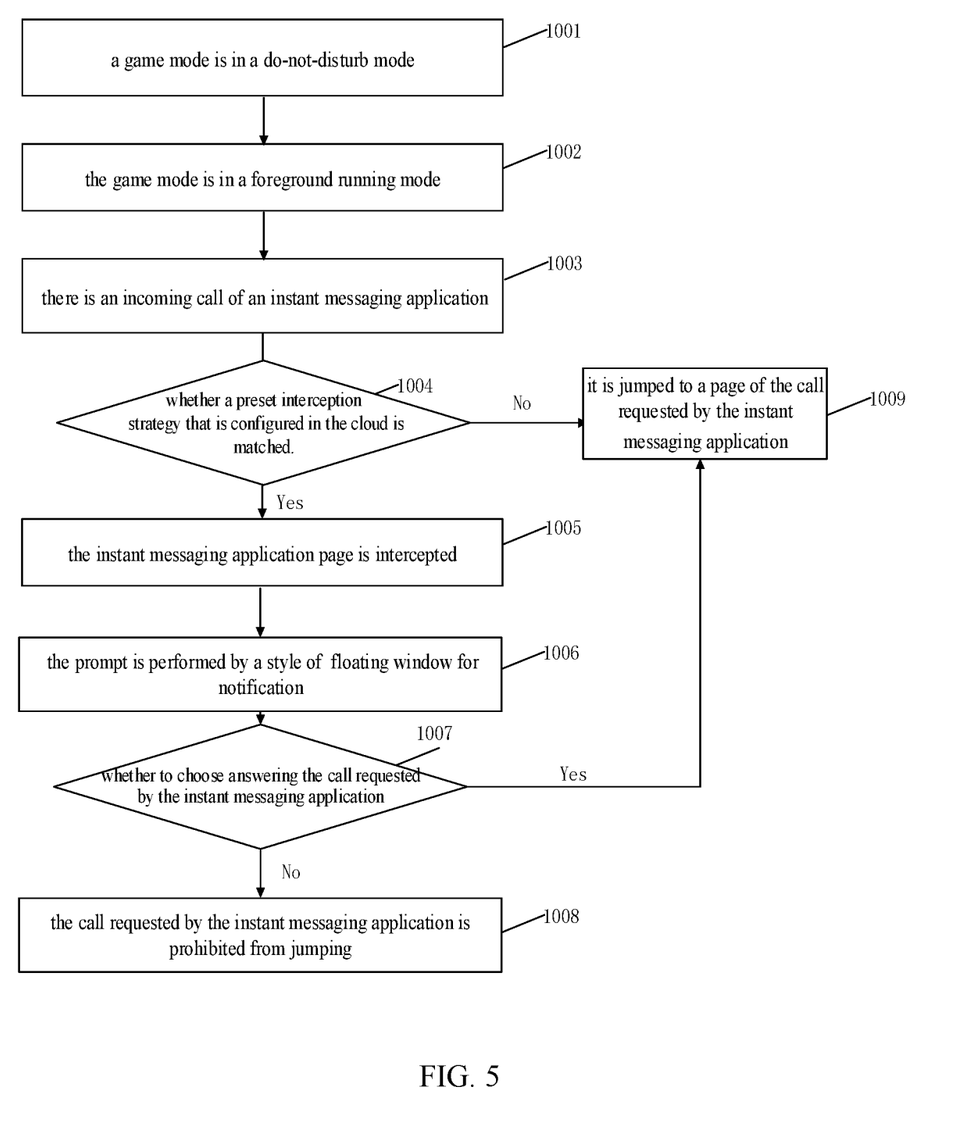
FIG. 5 is a flowchart of an application page interception method according to yet another exemplary embodiment of the present disclosure.

FIG. 5 is a flowchart of an application page interception method according to yet another exemplary embodiment of the present disclosure. The application manner of the application page interception method in a specific application scenario is exemplarily described below with reference to FIG. 5.

In step S1001, a game mode is in a do-not-disturb mode.

The target application is a game application. In the game mode, the smart terminal is set as the do-not-disturb mode, indicating that the user does not want to be interrupted by other applications during the game.

In step S1002, the game mode is in a foreground running mode.

The user is playing the game.

In step S1003, there is an incoming call of an instant messaging application.

The instant messaging application sends a call request to the user.

In step S1004, it is determined whether a predetermined interception strategy that is configured in the cloud is matched.

According to the predetermined interception strategy in the cloud, it is selected whether to answer the call requested by the instant messaging application, that is, the interception strategy configured in the cloud includes the instant messaging application.

If the predetermined interception strategy that is configured in the cloud configuration is matched, step S1005 is performed.

In step S1005, the instant messaging application page is intercepted. When information of the instant messaging application matches the predetermined interception strategy, the instant messaging application is intercepted.

If the predetermined interception strategy that is configured in the cloud is not matched, step S1009 is performed.

In step S1006, the prompt is performed by a style of floating window for notification. A floating window pops up to prompt the user that there is a call request of the instant messaging application, which may include information of the call requester.

In step S1007, it is determined whether to choose answering the call requested by the instant messaging application.

The user can choose whether to answer the call of the instant messaging application according to the actual situation.

If the user chooses to answer, step S1009 is performed.

If the user chooses not to answer, step S1008 is performed.

In step S1008, the call requested by the instant messaging application is prohibited from jumping.

In step S1009, it is jumped to a page of the call requested by the instant messaging application.

Figure 6:
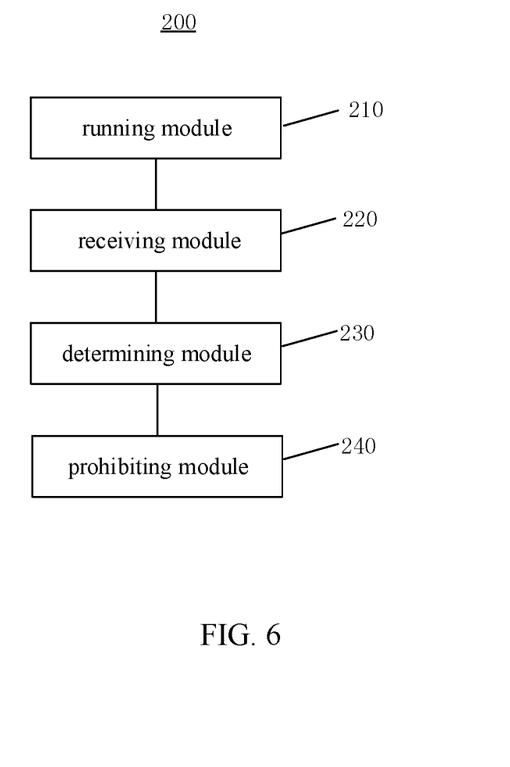
FIG. 6 is a block diagram of an application page interception device according to an exemplary embodiment of the present disclosure.

FIG. 6 is a block diagram of an application page interception device according to an exemplary embodiment of the present disclosure. Referring to FIG. 6, the application page interception device 200 includes:

a running module 210 configured to run a target application and responding to an operation for the target application;

a receiving module 220 configured to receive application information of other applications, the application information including operation display pages of the other applications;

a determining module 230 configured to determine whether the application information matches the predetermined interception strategy; and a prohibiting module 240 configured to prohibit operation display pages of the other applications from popping up when the application information matches the predetermined interception strategy.

In an embodiment, the predetermined interception strategy is based on the cloud configuration.

In an embodiment, the determining module 230 is further configured to determine whether a running mode of the target application is in a do-not-disturb mode; and determine whether the application information matches the predetermined intercepting strategy when the running mode of the target application is in the do-not-disturb mode.

Figure 7:
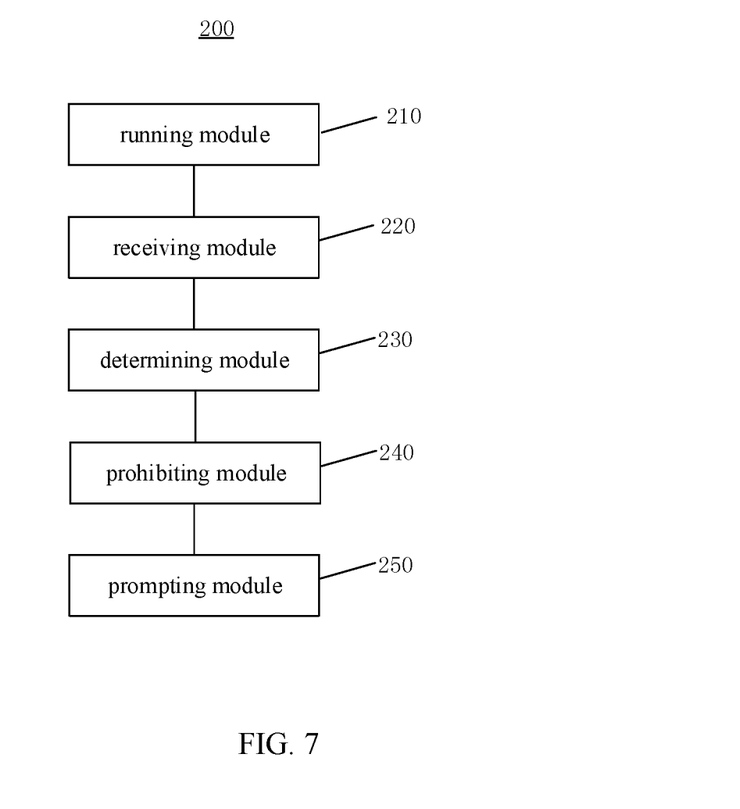
FIG. 7 is a block diagram of an application page interception device according to yet another exemplary embodiment of the present disclosure.

FIG. 7 is a block diagram of an application page interception device according to yet another exemplary embodiment of the present disclosure. Referring to FIG. 7, the application page interception device 200 further includes a prompting module 250. When the determining module 230 determines that the application information matches the predetermined intercepting strategy, the prompting module 250 is configured to generate a prompt message based on the application information, and display the prompt message through a floating window.

Figure 8:
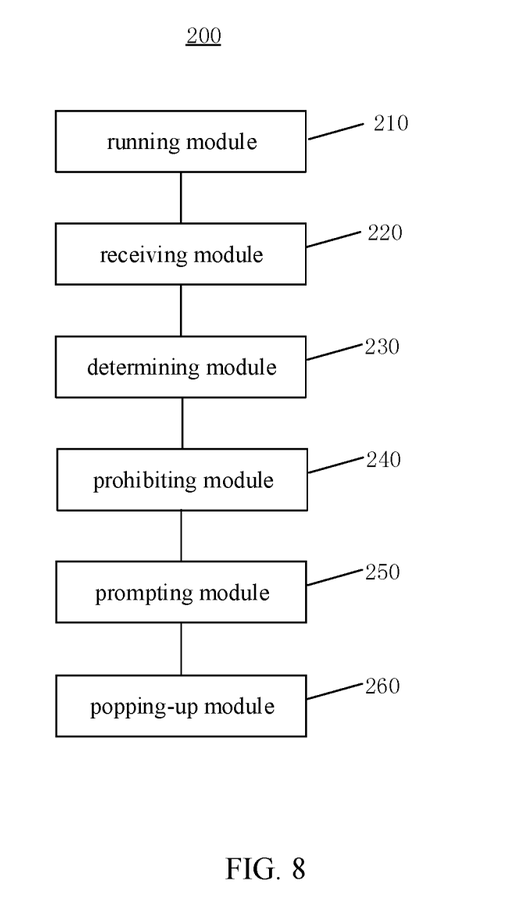
FIG. 8 is a block diagram of an application page interception device according to yet another exemplary embodiment of the present disclosure.

FIG. 8 is a block diagram of an application page interception device according to yet another exemplary embodiment of the present disclosure. Referring to FIG. 8, the application page interception device 200 further includes a popping-up module 260 configured to pop up operation display pages of the other applications when the user views the prompt message.

Figure 9:
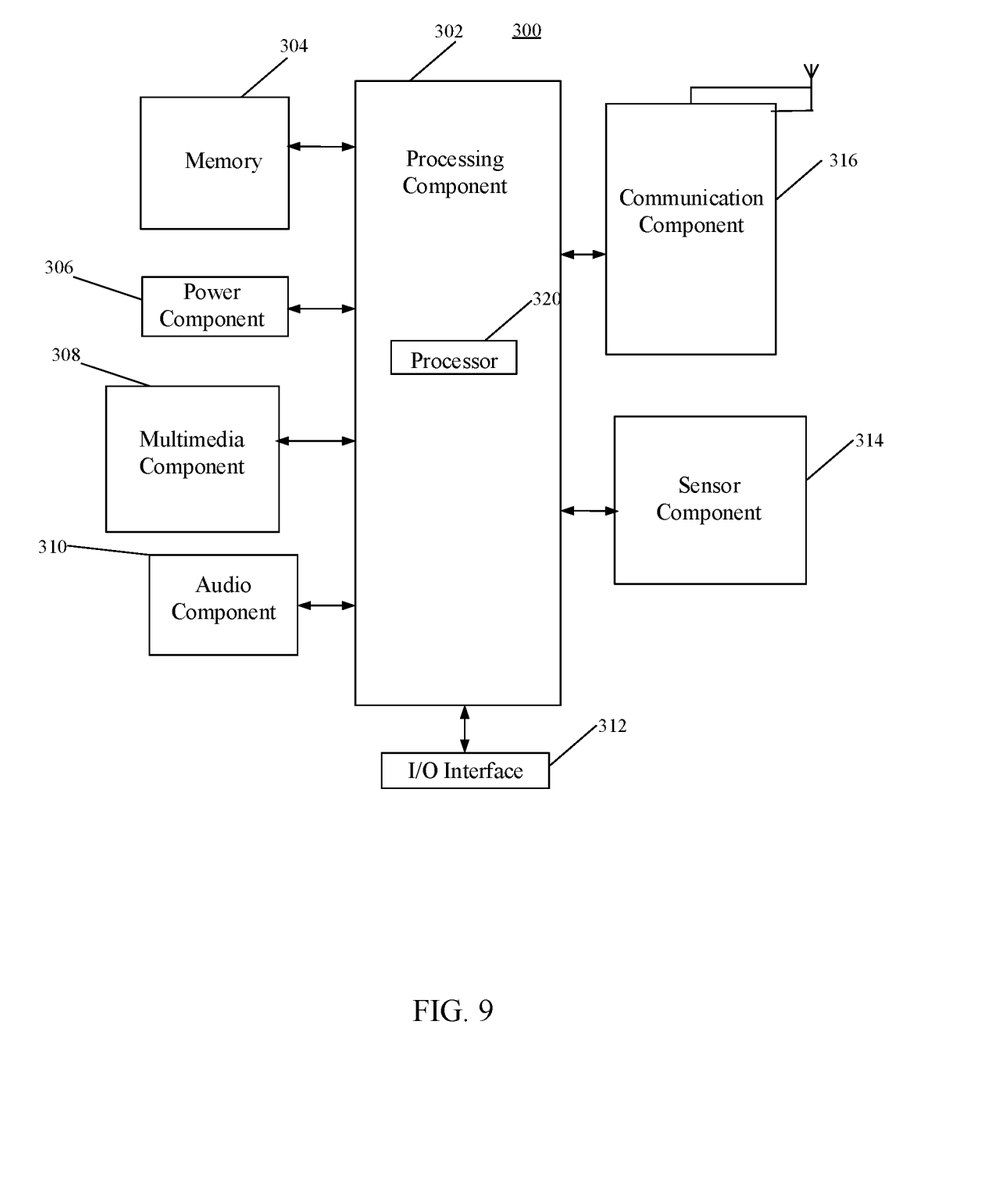
FIG. 9 is a block diagram of a device according to an exemplary embodiment of the present disclosure.

FIG. 9 is a block diagram of a device according to an exemplary embodiment. For example, the device 300 may be a mobile phone, a computer, a digital broadcast terminal, a messaging device, a gaming console, a tablet, a medical device, exercise equipment, a personal digital assistant, and the like.

Referring to FIG. 9, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls overall operations of the device 300, such as the operations associated with display, telephone calls, data communications, camera operations, and recording operations. The processing component 302 can include one or more processors 320 to execute instructions, so as to complete all or part of the steps in the above described methods. Moreover, the processing component 302 can include one or more modules which facilitate the interaction between the processing component 302 and other components. For instance, the processing component 302 can include a multimedia module to facilitate the interaction between the multimedia component 308 and the processing component 302.

The memory 304 is configured to store various types of data to support the operation of the device 300. Examples of such data include instructions for any applications or methods operated on the device 300, contact data, phonebook data, messages, pictures, video, etc. The memory 304 can be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 can include a power management system, one or more power sources, and any other components associated with the generation, management, and distribution of power in the device 300.

The multimedia component 308 includes a screen providing an output interface between the device 300 and the user. In some embodiments, the screen can include a liquid crystal display (LCD) and a touch panel (TP). In some embodiments, an organic light-emitting diode (OLED) or other types of displays can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also detect a period of time and a pressure associated with the touch or swipe action. In some embodiments, the multimedia component 308 includes a front camera and/or a rear camera. The front camera and the rear camera can receive external multimedia data while the device 300 is in an operation mode, such as a photographing mode or a video mode. Each of the front camera and the rear camera can be a fixed optical lens system or have focal length and optical zoom capability.

The audio component 310 is configured to output and/or input audio signals. For example, the audio component 310 includes a microphone ("MIC") configured to receive an external audio signal when the device 300 is in the operation mode, such as a call mode, a recording mode, and a voice recognition mode. The received audio signal can be further stored in the memory 304 or transmitted via the communication component 316. In some embodiments, the audio component 310 further includes a speaker to output audio signals.

The I/O interface 312 provides an interface between the processing component 302 and peripheral interface modules, such as a keyboard, a click wheel, buttons, and the like. The buttons can include, but are not limited to, a home button, a volume button, a starting button, and a locking button.

The sensor component 314 includes one or more sensors which include a full-time wording sensor to provide status assessments of various aspects of the device 300. For instance, the sensor component 314 can detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 can include a proximity sensor configured to detect the presence of nearby objects without any physical contact. The sensor component 314 can also include a light sensor, such as a CMOS or CCD image sensor, for use in imaging applications. In some embodiments, the sensor component 314 can also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as Wi-Fi, 2G, 3G, 4G, 5G, and a combination thereof. In one exemplary embodiment, the communication component 316 receives a broadcast signal or broadcast associated information from an external broadcast management system via a broadcast channel. In one exemplary embodiment, the communication component 316 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 300 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 304 including instructions, the above instructions can be executed by the processor 320 in the device 300, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium, instructions in which are executed by a processor of a mobile terminal to cause the mobile terminal to execute any one of the application page interception methods described above.

The application page interception method and device provided in the present disclosure can prohibit the operation display pages of other applications from popping up according to the predetermined interception strategy when a target application is run, so as to avoid the user from being disturbed by the popped-up operation display pages of other applications when the target application is run, thereby improving the user experience.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "units," "components" or "layers," etc. merely reflect various logical functions according to some embodiments, and actual implementations can have other divisions of "regions," "units," "components" or "layers," etc. realizing similar functions as described above, or without divisions. For example, multiple regions, units, or layers, etc. can be combined or can be integrated into another system. In addition, some features can be omitted, and some steps in the methods can be skipped.

Those of ordinary skill in the art will appreciate that the units, components, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

The invention claimed is:

1. An application page interception method, applied to a user terminal, wherein the method comprises:

running a target application on the user terminal, and responding to an operation for the target application performed by a user;

receiving application information of other applications in a process of running the target application, wherein the application information includes operation display pages of the other applications;

determining whether the application information matches a predetermined interception strategy;

prohibiting operation display pages of the other applications from popping up when the application information matches the predetermined interception strategy;

determining whether a running mode of the target application is in a do-not-disturb mode; and determining whether the application information matches the predetermined interception strategy when the running mode of the target application is in the do-not-disturb mode, wherein when the running mode of the target application is in a normal state, it is not performed to determine whether to intercept the application page, thereby avoiding unnecessary application page interception.

2. The application page interception method of claim 1, wherein the predetermined interception strategy is based on cloud configuration.

3. The application page interception method of claim 1, further comprising:
popping up operation display pages of the other applications when a user views the prompt message.

4. A non-transitory computer-readable storage medium having stored thereon instructions that, when executed by a processor, cause the processor to perform operations of the application page interception method of claim 1.

5. The non-transitory computer-readable storage medium of claim 4, wherein the predetermined interception strategy is based on cloud configuration.

6. The non-transitory computer-readable storage medium of claim 4, the method further comprising:
determining whether a running mode of the target application is in a do-not-disturb mode; and
determining whether the application information matches the predetermined interception strategy when the running mode of the target application is in the do-not-disturb mode.

7. The non-transitory computer-readable storage medium of claim 4, the method further comprising:
popping up operation display pages of the other applications when a user views the prompt message.

8. An electronic device implementing the method of claim 1, the electronic device comprising:
a memory configured to store instructions; and
a processor configured to invoke the instructions to execute the application page interception method.

9. The electronic device of claim 8, wherein the predetermined interception strategy is based on cloud configuration.

10. The electronic device of claim 8, the method further comprising:
when the application information matches the predetermined interception strategy, generating a prompt message according to the application information, and displaying the prompt message through the floating window; and
popping up operation display pages of the other applications when a user views the prompt message.

11. A mobile terminal implementing the method of claim 1, wherein the mobile terminal comprises a display screen; and wherein the mobile terminal is configured to prevent a user from being interrupted by the other applications when operating the target application.

12. The application page interception method of claim 1, further comprising:
when the application information matches the predetermined interception strategy, generating a prompt message according to the application information, and displaying the prompt message through a floating window.

13. The non-transitory computer-readable storage medium of claim 4, the method further comprising:
when the application information matches the predetermined interception strategy, generating a prompt message according to the application information, and displaying the prompt message through the floating window.

14. An application page interception device, applied to a user terminal, wherein the device comprises:
a running module configured to run a target application on the user terminal, and responding to an operation for the target application performed by a user;
a receiving module configured to receive application information of other applications in a process of running the target application, which includes operation display pages of the other applications;
a determining module configured to determine whether the application information matches the predetermined interception strategy; and
a prohibiting module configured to prohibit operation display pages of the other applications from popping up when the application information matches the predetermined interception strategy; and
wherein the determining module is further configured to:
determine whether a running mode of the target application is in a do-not-disturb mode; and
determine whether the application information matches the predetermined interception strategy when the running mode of the target application is in the do-not-disturb mode,
wherein when the running mode of the target application is in a normal state, it is not performed to determine whether to intercept the application page, thereby avoiding unnecessary application page interception.

15. The application page interception device of claim 14, wherein the predetermined interception strategy is based on cloud configuration.

16. The application page interception device of claim 14, wherein the device further comprises a popping-up module configured to:
pop up operation display pages of the other applications when a user views the prompt message.

17. The application page interception device of claim 14, wherein the device further comprises a prompt module; when the determining module determines that the application information matches the predetermined interception strategy, the prompt module is configured to generate a prompt message according to the application information, and display the prompt message through the floating window.

* * * * *